M. POTTER.
LEVER AND RATCHET FOR VEHICLE BRAKES.
APPLICATION FILED MAR. 6, 1908.
904,148.
Patented Nov. 17, 1908.
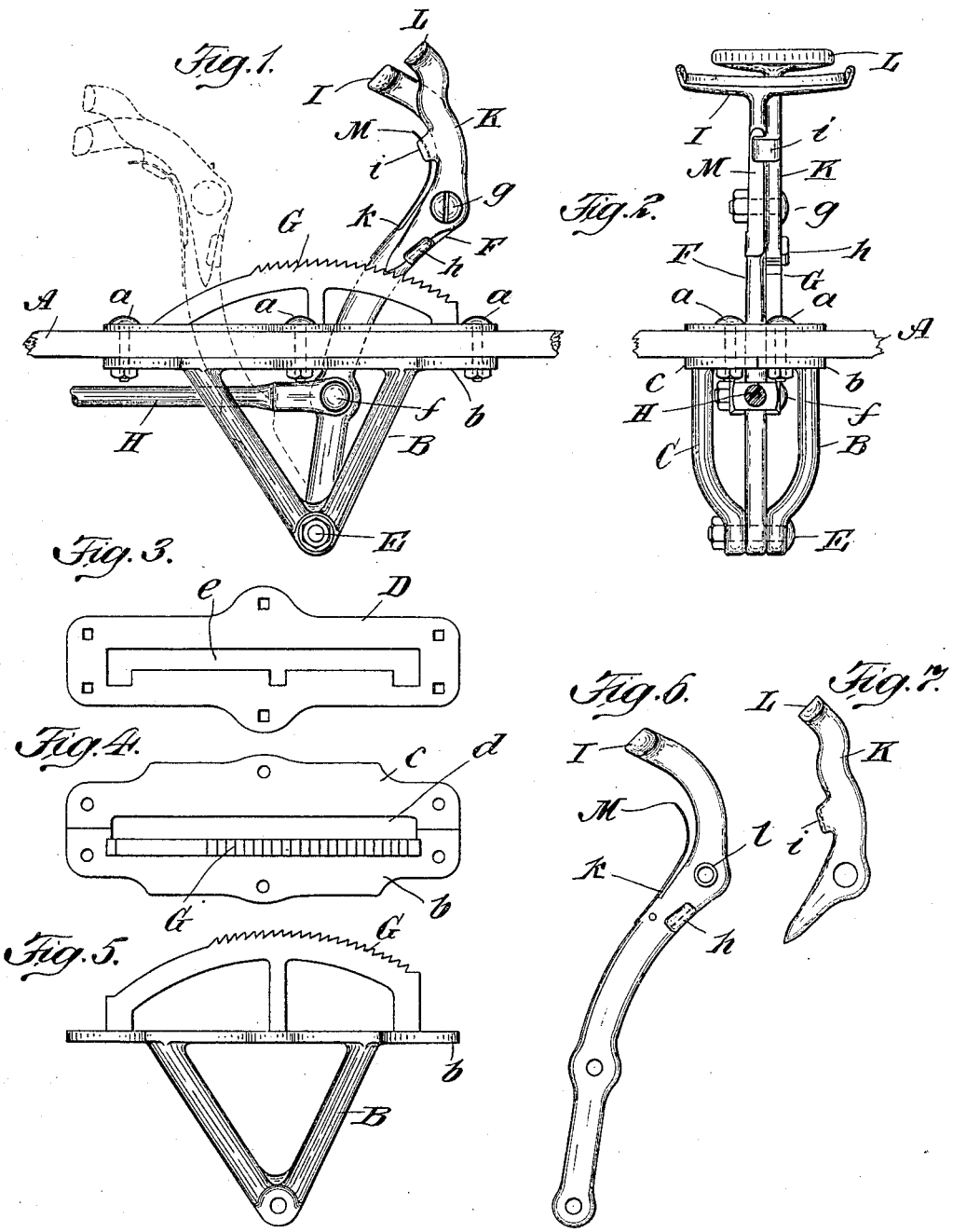

UNITED STATES PATENT OFFICE.

MORGAN POTTER, OF FISHKILL-ON-THE-HUDSON, NEW YORK.

LEVER AND RATCHET FOR VEHICLE-BRAKES.

No. 904,148. Specification of Letters Patent. Patented Nov. 17, 1908.

Application filed March 6, 1908. Serial No. 419,443.

*To all whom it may concern:*

Be it known that I, MORGAN POTTER, a citizen of the United States, residing at Fishkill-on-the-Hudson, in the county of Dutchess and State of New York, have invented certain new and useful Improvements in Levers and Ratchets for Vehicle-Brakes, of which the following is a full, clear, and exact specification, reference being had to the accompanying drawings and the reference characters marked thereon.

This invention has relation to brakes for vehicles of any character wherein the power to move the brake is supplied by the driver or operator; and the invention has for its object the production of a simple, cheap, reliable and efficient brake operating lever and ratchet connections therefor, the parts being arranged to be easily, quickly and securely mounted in place on the vehicle and the ratchet connections being such that they can be reliably engaged and easily disengaged as occasion may require.

To accomplish all of the foregoing and to secure other and further advantages in the matters of construction, operation and use, my invention involves certain novel and useful arrangements or combinations of parts, peculiarities of construction and principles of operation, as will be herein first fully described and then pointed out in the claims.

In the accompanying drawings forming part of this specification, I have shown a brake operating appliance constructed and arranged for operation in accordance with my invention and involving my improvements, omitting the brake blocks and the mountings thereof which may be of any desired character and which are unnecessary to be shown herein.

In these drawings Figure 1 is a view in side elevation showing a preferred form of my improved device, the operating lever being represented in full lines as in locked position, the pawl connected with this lever being in engagement with the rack, and in dotted lines the lever and its pawl moved to a position free from the rack. Fig. 2 is an end elevation corresponding with Fig. 1, looking from the left of that figure. Fig. 3 is a detail view, in plan, of a guard plate employed on the upper surface of the bottom or other part of the vehicle whereon the improved device is applied. Fig. 4 is a detail view in plan showing the tops of the fulcrum supporting arms or brackets, the ratchet being in place in connection with one of these tops. Fig. 5 is a side elevation showing one of the fulcrum supporting arms or brackets with a rack in place in connection therewith. Fig. 6 is a side elevation of the operating lever shown in Figs. 1 and 2, the same being detached from the other parts. Fig. 7 is a side elevation of the pawl shown in Figs. 1 and 2, the same being detached from the lever.

In these several figures like reference characters, wherever they are employed, indicate corresponding parts.

A represents the bottom board or other portion of a vehicle on which it may be desired to mount the brake operating lever and its attachments.

B and C are two brackets arranged to extend below the support and to sustain the fulcrum for the operating lever. These brackets are preferably of cast metal and each is supplied with a flat portion or top, represented at $b$, and $c$, for bearing against the underside of the support and to receive the assembling bolts, represented at $a$, $a$. The tops $b$ and $c$ abut against each other as shown in Fig. 4, a slot $d$ being left between them to permit the operating lever to move back and forth through it. Over the tops $b$ and $c$ and on the support is located a guard plate, D, perforated to admit the bolts $a$ and slotted, as at $e$, to permit the operating lever to move therein. This top plate fits around the legs of the ratchet, and, when the parts are bolted in place as indicated, the brackets and ratchet are immovably held with respect to the support so that the fulcrum is rigidly sustained in respect thereto. An opening is cut through the support to correspond with the slots $d$ and $e$, and the operating lever is projected through the support and the slots in the top plate and in the bracket tops and is fulcrumed at the lower ends of the brackets. For this fulcrum a suitable bolt, E, is supplied, the same being calculated also to hold the lower portions of the brackets rigid with respect to each other, or to properly couple them together at the bottom.

F is the operating lever and G the ratchet or rack by which the lever is to be held in the position to which it may be forcibly adjusted. The operating lever is normally free of control by the rack, as indicated in dotted lines in Fig. 1, being automatically swung to its unlocked position by the brake mechanism when the brakes are not set.

H is a rod for connecting the operating lever with the brake mechanism; and this rod is jointed with the operating lever at any preferred point, as at $f$. The coupling rod, H, is intended either to push or to pull, according to its location and arrangement with respect to the operating lever and its fulcrum, and this arrangement may be varied as in ordinary vehicle brake mechanism.

I is a rest applied on or formed on the upper end of the operating lever and intended to receive the foot of the driver or operator by which power is applied to move the operating lever and therefore to control the position of the brakes.

On one side of the operating lever F is hinged a pawl K, as upon a strong hinge bolt, $g$, the lower end of the pawl being shaped and arranged so as to engage with the rack whenever the pawl is allowed to swing in the proper direction upon the operating lever. The pawl is supplied with a foot-piece at L, the same being extended a little above the lever of the foot-piece I, but parallel therewith so that while the foot of the driver or operator may rest upon the foot-piece I, it can touch also the foot-piece L; and in order that the application of the foot to both foot-pieces may be convenient, the piece I is extended further on the side of the hinged pawl than on the other side, so that the foot-piece L will be nearly symmetrically arranged with respect to the foot-piece L, as shown in Fig. 2. The two foot pieces are in close proximity, that on the pawl being shorter than the one on the lever, or its ends terminating between the ends of the foot piece on the lever.

The operating lever is supplied with a stop piece or projection, $h$, which extends back of the lower end of the pawl and up a little on its outer side, so as to arrest and rigidly hold the pawl at the proper point and to prevent sidewise movement thereof with respect to the operating lever when the pawl is in engagement with the rack. The pawl is supplied with a projection, $i$, which extends to one side for engagement with a spring.

M is a leaf spring fixed at one end upon the operating lever and engaged at its free end by the projection $i$, the purpose of the spring being to normally swing the pawl so that its lower end will engage with the rack.

To prevent lodgment of dirt and dust between the spring and the operating lever, which would interfere with the proper operation of the spring, the material of the lever is cut away or otherwise fashioned so as to supply an abrupt ledge for the bearing of the spring, thereby producing an open space of considerable depth, as at $k$, near the foot of the spring in which space dust or dirt is not liable to accumulate or from which it could be easily and quickly removed so as not to interfere with the operation of the spring.

That the pawl may move fairly upon the side of the operating lever and be held rigidly to its proper working position, the lever is provided with a collar, $l$, on which the pawl is mounted and through which the coupling bolt, $g$, is made to pass. The two foot pieces are located on the same side of the pawl hinge.

The device being constructed and arranged substantially in accordance with the foregoing explanations and being mounted in place upon a vehicle and connected with the brake mechanism, the operating lever normally swings free and clear of the rack, as indicated at the dotted lines in Fig. 1. When it is desired to apply the brake, the driver or operator presses with his foot upon the foot-piece I, pushing the lever over more or less so that the pawl may engage with the rack. The spring M insures engagement of the pawl with the rack, but by inclining the foot upon the foot-piece I, the driver or operator is enabled to touch the foot piece L, so as to swing the pawl out of engagement with the rack and therefore to release it and the lever on which it is mounted.

The movements of the lever are easy and convenient, are controlled entirely by the foot of the driver or operator, and when in position to set the brake the device holds rigidly and perfectly, and is as easily and conveniently released, as occasion requires.

While the device is shown as specially adapted to be operated by application of the foot, manifestly the same general plan of construction might be adopted in connection with an operating lever intended to be solely operated by application of the hand, by extending the lever and the upper arm of the pawl to a sufficient distance.

Having now fully described my invention, what I claim as new herein and desire to secure by Letters Patent, is:

1. In a lever and ratchet appliance for vehicle brakes, an operating lever, a pawl and a ratchet, said lever being supplied with a stop piece arranged to engage the lower portion of the pawl and with a collar for entering a recess in the pawl, and a coupling bolt passing through the collar and through the pawl, the parts being combined and arranged substantially as set forth.

2. In a lever and ratchet appliance for vehicle brakes, the combination of an operating lever, a rack, a pawl mounted on the lever, and a spring for engagement with the pawl, the operating lever being provided with a ledge and the spring being applied on the lever and extending beyond and over the ledge, thereby affording a free open space between the lever and spring, and the pawl being provided with a projection for engaging the spring, the parts being constructed and arranged substantially as set forth.

3. The combination with the lever having a foot piece at its upper end, of a pawl having a foot piece at its upper end located outside the foot piece on the lever, and a rack, the pawl being hinged upon the lever and the foot piece of the pawl being located parallel with and in proximity to the foot piece of the lever and terminating on the outside of and parallel with the ends of the foot piece on the lever, the latter being extended on the side towards the pawl, the parts being arranged for operation substantially as set forth.

4. The herein described lever and ratchet appliance for vehicle brakes comprising in combination, an operating lever, brackets between which the lever is fulcrumed, a ratchet on one of the brackets, a coupling rod, a pawl mounted on the lever, and a spring, the lever being provided with a collar and projection for holding the pawl to place and the pawl having a projection for engaging the free end of the spring, said lever and pawl being provided each with a foot piece, substantially as shown and described.

MORGAN POTTER.

Witnesses:
M. E. CURTISS,
I. B. CAMMACK.